Patented Jan. 28, 1947

2,415,046

UNITED STATES PATENT OFFICE 2,415,046

ACETALS OF NITRO ALCOHOLS

Murray Senkus, Terre Haute, Ind., assignor to Commercial Solvents Corporation, Terre Haute, Ind., a corporation of Maryland No Drawing. Application April 21, 1944,
Serial No. 532,213

6 Claims. (Cl. 260—611)

My invention relates to new and useful acetals of nitro alcohols, and the process of producing the same. More particularly, it is concerned with acetals having the following general structural formula:

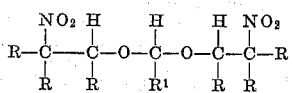

wherein R represents a member selected from the group consisting of hydrogen and alkyl, and $R^1$ represents a member chosen from the group consisting of hydrogen, alkyl and aryl. As examples of such compounds there may be mentioned the bis(2-nitro-2-methylpropoxy) methanes and the bis(2-nitrobutoxy) methanes which have the following structural formulas:

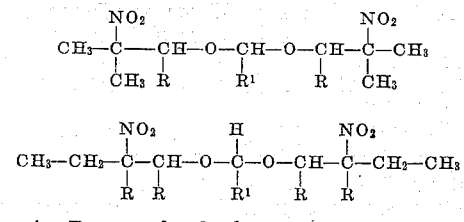

wherein R may be hydrogen or alkyl, and $R^1$ may be either alkyl, or aryl.

These compounds may, in general, be prepared by distilling a mixture consisting of a nitro alcohol and the desired aldehyde in the presence of a small amount of a catalyst, such as hydrochloric acid, phosphoric acid, sulfuric acid, benzenesulfonic acid, or para-toluenesulfonic acid. In certain instances it is desirable to employ a molecular excess of the aldehyde. Likewise, it is frequently desirable to add to the reaction mixture a liquid such as toluene, which is capable of removing the water produced during acetal formation. Since the reaction between nitro alcohols and aldehydes is quite sluggish, the water formed thereby is not produced at a rate sufficient for it to be removed from the reaction mixture as a constant boiling mixture with the water immiscible liquid employed. Thus, the water is removed under such conditions by entrainment rather than as a constant boiling mixture.

The compounds produced in this manner may be obtained in a relatively pure state by washing the crude reaction mixture with a suitable quantity of water. If necessary, a dilute solution of a weak alkaline material, such as sodium or potassium carbonate, may be first employed to neutralize the acid catalyst present, followed by washing with water to remove any additional impurities. The liquid acetals produced in such instances are preferably obtained by distillation at reduced pressures; whereas, the acetals which are solids at room temperature are separated from the reaction mixture by filtration, or any other satisfactory means, after which said acetals may be conveniently purified at temperatures slightly above their melting point by washing, if desired, with a dilute alkali solution, followed by treatment with water. Upon cooling, the solid products thus obtained may be further freed from impurities by recrystallization from a solvent, such as benzene, petroleum ether, ether, and the like. Colored impurities, in either the liquid or solid products, may be effectively removed by means of heating these products in the presence of a small amount of a decolorizing carbon, or similar materials.

One of the unpredictable features of the process of my invention is that I am able to effect the reaction at temperatures which the nitro alcohols have been known to explode, i. e., temperatures of about 100° C. and above. In accordance with the process of my invention I am able to carry out the reaction between the desired aldehyde and nitro alcohol at reaction mixture temperatures of between about 100 and 200° C. The temperature of the reaction mixture may be controlled, at least to a certain extent, by the composition of such mixture. For example, lower temperatures are generally obtainable by the use of a suitable solvent such as toluene or benzene; however, as the reaction proceeds the temperature of the reaction mixture will be observed to increase, owing to the formation of the acetal which has a lower vapor pressure than any of the starting materials employed. Reaction mixture temperatures in the neighborhood of 200° C. are frequently reached in instances where relatively high boiling aldehydes are used in the absence of a solvent. Thus, for example, when employing benzaldehyde which boils at 179.5° C., pot temperatures of about 200° C. are required to continuously remove the water formed during the reaction.

The nitro alcohols which may be employed in my invention may be any of such compounds which are capable of forming acetals under the prescribed conditions. More specifically, these compounds may be represented by the following general formula:

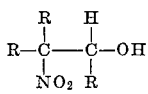

wherein R is either an alkyl group or a hydrogen atom. Specific examples of nitro alcohols included by the above general formulas are 2-nitro-2-methyl-1-propanol, 3-nitro-3-methyl-2-butanol, 2-nitro-1-butanol, 2-nitro-1-ethanol, 3-methyl-2-nitro-1-butanol, 3-nitro-2-butanol, and the like.

The aldehydes which may be utilized in the preparation of the acetals of my invention may be represented by the general formula:

RCHO in which R may represent hydrogen, alkyl and aryl. As examples of the specific aldehydes which are included by the above formula, there may be mentioned formaldehyde, acetaldehyde, butyraldehyde, propionaldehyde, isobutyraldehyde, benzaldehyde, and the like.

The following examples describe certain of the new acetals of nitro alcohols, and methods for producing the same. However, they are not to be construed as limiting my invention since I have found that the reaction between the aldehydes and nitro alcohols of the types described above is general, and may be readily effected with a wide variety of aldehydes and nitro alcohols.

*Example I*

Bis(2-nitro-2-methylpropoxy)methane was prepared by distilling a mixture consisting of 119 parts of 2-nitro-2-methyl-1-propanol, 17 parts of formaldehyde, 173 parts of toluene, and 0.2 part of benzene sulfonic acid. The temperature of the reaction mixture during this operation was between 115 and 120° C. When approximately 130 parts of distillate had been recovered, the heating was discontinued, the still residue cooled and washed with approximately 200 parts of water, and dried. The crude bis(2-nitro-2-methylpropoxy)methane was recrystallized twice from ether, yielding a colorless, odorless crystalline solid melting at 62.1° C. (uncorrected).

Analysis: Calculated for $C_9H_{18}N_2O_6$: N, 11.20; found: N, 11.18.

*Example II*

2-methyl-1,1-bis(2-nitro-2-methylpropoxy)propane was prepared by heating a mixture consisting of 80 parts of 2-nitro-2-methyl-1-propanol, 200 parts of freshly-distilled isobutyraldehyde, and 0.5 part of para-toluenesulfonic acid at 100° C. for four hours. Under these conditions the water formed during the reaction was entrained in the aldehyde vapors. The residue was agitated with five parts of anhydrous sodium carbonate and filtered. The product obtained in this manner was washed with several portions of water consisting of 400 parts, treated with five parts of decolorizing charcoal at 100° C. for approximately three hours, and filtered. The unreacted 2-nitro-2-methyl-1-propanol which remained in the filtrate was removed by distillation in vacuo. The residue was dissolved in 100 parts of petroleum ether and the solution cooled until the product crystallized. The crude product thus obtained was recrystallized twice from petroleum ether, giving a colorless crystalline material melting at 60° C. (uncorrected).

Analysis: Calculated for $C_{12}H_{24}N_2O_6$: N, 9.59; found: N, 9.74.

*Example III*

A mixture of 89 parts of 2-nitro-1-butanol, 15 parts of formaldehyde, 173 parts of toluene, and 0.5 part of benzene sulfonic acid was heated to a pot temperature of 115–120° C. until approximately 165 parts of toluene and the water formed during the reaction had distilled off. The reaction mixture was then treated with approximately 5 parts of potassium carbonate, agitated and filtered. The filtrate was then treated with several 200 part portions of water, and distilled in vacuo. The material which boiled at 166° C. (4 mm.) amounted to 67 parts, corresponding to a yield of 72 per cent. An analysis of the material showed that it was bis(2-nitrobutoxy)methane.

Analysis: Calculated for $C_9H_{18}N_2O_6$: N, 11.20; found: N, 10.97.

*Example IV*

Bis(2-nitro-2-methylpropoxy)phenylmethane was prepared by heating a mixture consisting of 119 parts of 2-nitro-2-methyl-1-propanol, 70 parts of benzaldehyde, 135 parts of toluene, and 1 part of para-toluenesulfonic acid for sixteen hours at a pot temperature of 130° C. The water which formed in the reaction was distilled off with the toluene. The residue was then distilled at a reduced pressure of 5 mm. to remove any unreacted aldehyde and nitro alcohol. Five parts of anhydrous potassium carbonate was added to the residue, and the mixture was agitated and filtered. The filtrate was treated with decolorizing carbon for one hour at 100° C., and filtered. On cooling the filtrate solidified. The crude product was purified by recrystallizing from petroleum ether yielding a crystalline material melting at 63° C. (uncorrected).

Analysis: Calculated for $C_{15}H_{22}N_2O_6$: N, 8.59; found: N, 8.53.

The acetals prepared as outlined above are either colorless, odorless liquids, or white crystalline solids and are soluble in the common organic solvents, such as methanol, acetone, ether, and benzene. The acetals of my invention have been found to be useful as reagents in the preparation of new diamines of the type described in my copending application U. S. Serial No. 441,022, filed April 29, 1942. Other uses for such products will readily occur to those skilled in the art.

This is a continuation-in-part of my copending application, U. S. Serial No. 434,173, filed March 11, 1942.

My invention now having been described, what I claim is:

1. As new chemical compounds, acetals having the following structural formula:

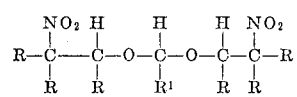

wherein R represents a member selected from the group consisting of hydrogen and alkyl, and $R^1$ is a phenyl group.

2. Bis(2-nitro-2-methylpropoxy)phenylmethane.

3. In a process for the production of acetals from nitro alcohols, the step which comprises reacting an aldehyde with an aliphatic nitro alcohol in the presence of an acid catalyst and at temperatures ranging from 100 to 200° C., said aliphatic nitro alcohol having the formula:

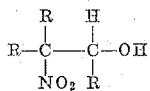

wherein R represents a member selected from the group consisting of hydrogen and alkyl, said aldehyde having the general formula

in which $R^1$ represents a member of the group consisting of hydrogen, alkyl and aryl, in a liquid reaction mixture having a boiling point of between 100 and 200° C.

4. The process of claim 3 in which the nitro alcohol is 2-nitro-2-methyl-1-propanol and the aldehyde is isobutyraldehyde.

5. The process of claim 3 in which the nitro alcohol is 2-nitro-2-methyl-1-propanol and the aldehyde is benzaldehyde.

6. The process of claim 3 in which the nitro alcohol is 2-nitro-1-butanol and the aldehyde is formaldehyde.

MURRAY SENKUS.